(12) United States Patent
Mason, Jr. et al.

(10) Patent No.: US 7,308,370 B2
(45) Date of Patent: Dec. 11, 2007

(54) USING A FIXED NETWORK WIRELESS DATA COLLECTION SYSTEM TO IMPROVE UTILITY RESPONSIVENESS TO POWER OUTAGES

(75) Inventors: Robert T Mason, Jr., Raleigh, NC (US); Andrew J Borleske, Garner, NC (US); Kenneth C Shuey, Zebulon, NC (US)

(73) Assignee: Elster Electricity LLC, Raleigh, NC (US)

( * ) Notice: Subject to any disclaimer, the term of this patent is extended or adjusted under 35 U.S.C. 154(b) by 0 days.

(21) Appl. No.: 11/236,479

(22) Filed: Sep. 27, 2005

(65) Prior Publication Data

US 2006/0217936 A1 Sep. 28, 2006

Related U.S. Application Data

(60) Provisional application No. 60/664,042, filed on Mar. 22, 2005.

(51) Int. Cl.
*G01R 31/00* (2006.01)
(52) U.S. Cl. ............... 702/65; 702/59; 702/61; 702/188; 340/870.02
(58) Field of Classification Search ............ 702/62, 702/65, 61, 58
See application file for complete search history.

(56) References Cited

U.S. PATENT DOCUMENTS

| | | | |
|---|---|---|---|
| 3,445,815 A | 5/1969 | Saltzberg et al. | 340/163 |
| 3,858,212 A | 12/1974 | Tompkins et al. | 343/100 CS |
| 3,878,512 A | 4/1975 | Kobayashi et al. | 340/168 R |
| 3,973,240 A | 8/1976 | Fong | 340/151 |
| 4,031,513 A | 6/1977 | Simciak | 340/152 T |
| 4,056,107 A | 11/1977 | Todd et al. | 130/27 |
| 4,066,964 A | 1/1978 | Costanza et al. | 325/55 |
| 4,132,981 A | 1/1979 | White | 340/203 |
| 4,190,800 A | 2/1980 | Kelly, Jr. et al. | 325/37 |
| 4,204,195 A | 5/1980 | Bogacki | 340/151 |
| 4,218,737 A | 8/1980 | Buscher et al. | 364/493 |
| 4,250,489 A | 2/1981 | Dudash et al. | 340/147 |

(Continued)

FOREIGN PATENT DOCUMENTS

CH 682196 A5 7/1993

(Continued)

OTHER PUBLICATIONS

Yan Liu et al., "Distribution system outage and restoration analysis using a wireless AMR system", Jan. 27-31, 2002, IEEE, IEEE Power Engineering Society Winter Meeting, 2002, vol. 2, pp. 871-875.*

(Continued)

*Primary Examiner*—Hal Wachsman
(74) *Attorney, Agent, or Firm*—Woodcock Washburn LLP (57) ABSTRACT

A system for determining service outages and restorations includes an outage management server (OMS) that generates reports of outages and restoration information for metering endpoints. The outages may be caused by faults at various locations in the distribution network. The metering endpoint may include a transmitter having a battery backup that transmits the outage information upon a failure to detect a voltage at the endpoint. The transmission of the information may be filtered based on configurable criteria. The metering endpoints may also inform the OMS when power is restored.

16 Claims, 4 Drawing Sheets

U.S. PATENT DOCUMENTS

| | | | |
|---|---|---|---|
| 4,254,472 A | 3/1981 | Juengel et al. | 364/900 |
| 4,319,358 A | 3/1982 | Sepp | 375/1 |
| 4,321,582 A | 3/1982 | Banghart | 340/310 |
| 4,322,842 A | 3/1982 | Martinez | 370/204 |
| 4,328,581 A | 5/1982 | Harmon et al. | 371/8 |
| 4,361,851 A | 11/1982 | Asip et al. | 358/84 |
| 4,361,890 A | 11/1982 | Green, Jr. et al. | 375/1 |
| 4,396,915 A | 8/1983 | Farnsworth et al. | 340/870.03 |
| 4,405,829 A | 9/1983 | Rivest et al. | 178/22.14 |
| 4,415,896 A | 11/1983 | Allgood | 340/870.03 |
| 4,466,001 A | 8/1984 | Moore et al. | 340/825.08 |
| 4,504,831 A | 3/1985 | Jahr et al. | 340/870.03 |
| 4,506,386 A | 3/1985 | Ichikawa et al. | 455/343 |
| 4,513,415 A | 4/1985 | Martinez | 370/92 |
| 4,525,861 A | 6/1985 | Freeburg | 455/33 |
| 4,600,923 A | 7/1986 | Hicks et al. | 340/870.02 |
| 4,608,699 A | 8/1986 | Batlivala et al. | 375/216 |
| 4,611,333 A | 9/1986 | McCallister et al. | 375/1 |
| 4,614,945 A | 9/1986 | Brunius et al. | 340/870.03 |
| 4,617,566 A | 10/1986 | Diamond | 340/870.11 |
| 4,628,313 A | 12/1986 | Gombrich et al. | 340/870.02 |
| 4,631,538 A | 12/1986 | Carreno | 340/870.18 |
| 4,638,298 A | 1/1987 | Spiro | 340/827 |
| 4,644,321 A | 2/1987 | Kennon | 340/310 |
| 4,653,076 A | 3/1987 | Jerrim et al. | 375/115 |
| 4,672,555 A | 6/1987 | Hart et al. | 700/276 |
| 4,680,704 A | 7/1987 | Konicek et al. | 364/525 |
| 4,688,038 A | 8/1987 | Giammarese | 340/870.02 |
| 4,692,761 A | 9/1987 | Robinton | 340/825 |
| 4,707,852 A | 11/1987 | Jahr et al. | 379/107 |
| 4,713,837 A | 12/1987 | Gordon | 379/93 |
| 4,724,435 A | 2/1988 | Moses et al. | 340/870.13 |
| 4,728,950 A | 3/1988 | Hendrickson et al. | 340/870.31 |
| 4,734,680 A | 3/1988 | Gehman et al. | 340/539 |
| 4,749,992 A | 6/1988 | Fitzmeyer et al. | 340/870.02 |
| 4,749,992 A | 6/1988 | Fitzmeyer et al. | 340/870.02 |
| 4,757,456 A | 7/1988 | Benghiat | 364/464 |
| 4,769,772 A | 9/1988 | Dwyer | 364/300 |
| 4,783,748 A | 11/1988 | Swarztrauber et al. | 364/483 |
| 4,792,946 A | 12/1988 | Mayo | 370/338 |
| 4,799,059 A | 1/1989 | Grindahl et al. | 340/870.03 |
| 4,804,938 A | 2/1989 | Rouse et al. | 340/310 |
| 4,804,957 A | 2/1989 | Selph et al. | 340/870.03 |
| 4,811,011 A | 3/1989 | Sollinger | 340/870.02 |
| 4,827,514 A | 5/1989 | Ziolko et al. | 380/48 |
| 4,833,618 A | 5/1989 | Verma et al. | 364/483 |
| 4,839,645 A | 6/1989 | Lill | 340/870.17 |
| 4,841,545 A | 6/1989 | Endo et al. | 375/1 |
| 4,860,379 A | 8/1989 | Schoeneberger et al. | 455/5 |
| 4,862,493 A | 8/1989 | Venkataraman et al. | 379/107 |
| 4,868,877 A | 9/1989 | Fischer | 380/25 |
| 4,884,021 A | 11/1989 | Hammond et al. | 324/142 |
| 4,912,722 A | 3/1990 | Carlin | 375/1 |
| 4,922,518 A | 5/1990 | Gordon et al. | 379/57 |
| 4,939,726 A | 7/1990 | Flammer et al. | 370/94.1 |
| 4,940,974 A | 7/1990 | Sojka | 340/825.08 |
| 4,940,976 A | 7/1990 | Gastouniotis et al. | 340/870.02 |
| 4,958,359 A | 9/1990 | Kato | 375/1 |
| 4,964,138 A | 10/1990 | Nease et al. | 375/1 |
| 4,965,533 A | 10/1990 | Gilmore | 331/18 |
| 4,972,507 A | 11/1990 | Lusignan | 455/51 |
| 5,007,052 A | 4/1991 | Flammer | 370/85.6 |
| 5,018,165 A | 5/1991 | Sohner et al. | 375/1 |
| 5,022,046 A | 6/1991 | Morrow, Jr. | 375/1 |
| 5,032,833 A | 7/1991 | Laporte | 340/825.02 |
| 5,053,766 A | 10/1991 | Ruiz-del-Portal et al. | 340/870.02 |
| 5,053,774 A | 10/1991 | Schuermann et al. | 342/44 |
| 5,056,107 A | 10/1991 | Johnson et al. | 375/1 |
| 5,067,136 A | 11/1991 | Arthur et al. | 375/1 |
| 5,079,715 A | 1/1992 | Venkataraman et al. | 364/481 |
| 5,079,768 A | 1/1992 | Flammer | 370/94.1 |
| 5,086,292 A | 2/1992 | Johnson et al. | 340/637 |
| 5,086,385 A | 2/1992 | Launey | 364/188 |
| 5,090,024 A | 2/1992 | Vander Mey et al. | 375/1 |
| 5,111,479 A | 5/1992 | Akazawa | 375/1 |
| 5,115,433 A | 5/1992 | Baran et al. | 370/94.3 |
| 5,115,448 A | 5/1992 | Mori | 375/1 |
| 5,129,096 A | 7/1992 | Burns | 455/18 |
| 5,130,987 A | 7/1992 | Flammer | 370/103 |
| 5,132,985 A | 7/1992 | Hashimoto et al. | 375/1 |
| 5,136,614 A | 8/1992 | Hiramatsu et al. | 375/1 |
| 5,142,694 A | 8/1992 | Jackson et al. | 455/67.1 |
| 5,151,866 A | 9/1992 | Glaser et al. | 364/483 |
| 5,155,481 A | 10/1992 | Brennan, Jr. et al. | 340/870.02 |
| 5,160,926 A | 11/1992 | Schweitzer, III | 340/870.02 |
| 5,166,664 A | 11/1992 | Fish | 340/539 |
| 5,177,767 A | 1/1993 | Kato | 375/1 |
| 5,179,376 A | 1/1993 | Pomatto | 340/870.02 |
| 5,189,694 A | 2/1993 | Garland | 379/106 |
| 5,194,860 A | 3/1993 | Jones et al. | 340/370.02 |
| 5,197,095 A | 3/1993 | Bonnet | 379/107 |
| 5,204,877 A | 4/1993 | Endo et al. | 375/1 |
| 5,214,587 A | 5/1993 | Green | 364/464.04 |
| 5,225,994 A | 7/1993 | Arinobu et al. | 364/492 |
| 5,228,029 A | 7/1993 | Kotzin | 370/95.1 |
| 5,229,996 A | 7/1993 | Bäckström et al. | 370/100.1 |
| 5,239,575 A | 8/1993 | White et al. | 379/107 |
| 5,239,584 A | 8/1993 | Hershey et al. | 380/28 |
| 5,243,338 A | 9/1993 | Brennan, Jr. et al. | 340/870.02 |
| 5,252,967 A | 10/1993 | Brennan et al. | 340/870.02 |
| 5,260,943 A | 11/1993 | Comroe et al. | 370/95.1 |
| 5,270,704 A | 12/1993 | Sosa Quintana et al. | 340/870.02 |
| 5,280,498 A | 1/1994 | Tymes et al. | 375/1 |
| 5,280,499 A | 1/1994 | Suzuki | 375/1 |
| 5,285,469 A | 2/1994 | Vanderpool | 375/1 |
| 5,287,287 A | 2/1994 | Chamberlain et al. | 364/483 |
| 5,289,497 A | 2/1994 | Jacobson et al. | 375/1 |
| 5,295,154 A | 3/1994 | Meier et al. | 375/1 |
| 5,307,349 A | 4/1994 | Shloss et al. | 370/85.2 |
| 5,311,541 A | 5/1994 | Sanderford, Jr. | 375/1 |
| 5,311,542 A | 5/1994 | Eder | 375/1 |
| 5,315,531 A | 5/1994 | Oravetz et al. | 364/550 |
| 5,319,679 A | 6/1994 | Bagby | 375/106 |
| 5,329,547 A | 7/1994 | Ling | 375/1 |
| 5,345,225 A | 9/1994 | Davis | 340/635 |
| 5,359,625 A | 10/1994 | Vander Mey et al. | 375/1 |
| 5,377,222 A | 12/1994 | Sanderford, Jr. | 375/1 |
| 5,381,462 A | 1/1995 | Larson et al. | 379/107 |
| 5,383,134 A | 1/1995 | Wrzesinski | 364/514 |
| 5,384,712 A | 1/1995 | Oravetz et al. | 364/550 |
| 5,387,873 A | 2/1995 | Muller et al. | 327/155 |
| 5,390,360 A | 2/1995 | Scop et al. | 455/34.2 |
| 5,406,495 A | 4/1995 | Hill | 364/483 |
| 5,416,917 A | 5/1995 | Adair et al. | 395/500 |
| 5,420,799 A | 5/1995 | Peterson et al. | 364/483 |
| 5,428,636 A | 6/1995 | Meier | 375/202 |
| 5,430,759 A | 7/1995 | Yokev et al. | 375/202 |
| 5,432,507 A | 7/1995 | Mussino et al. | 340/870.03 |
| 5,432,815 A | 7/1995 | Kang et al. | 375/200 |
| 5,438,329 A | 8/1995 | Gastouniotis et al. | 340/870.02 |
| 5,448,230 A | 9/1995 | Schanker et al. | 340/870.03 |
| 5,448,570 A | 9/1995 | Toda et al. | 370/95.3 |
| 5,450,088 A | 9/1995 | Meier et al. | 342/51 |
| 5,452,465 A | 9/1995 | Geller et al. | 395/800 |
| 5,455,533 A | 10/1995 | Köllner | 327/484 |
| 5,455,544 A | 10/1995 | Kechkaylo | 332/103 |
| 5,455,569 A | 10/1995 | Sherman et al. | 340/825.02 |
| 5,455,822 A | 10/1995 | Dixon et al. | 370/18 |
| 5,457,713 A | 10/1995 | Sanderford, Jr. et al. | 375/206 |
| 5,461,558 A | 10/1995 | Patsiokas et al. | 364/145 |
| 5,463,657 A | 10/1995 | Rice | 375/200 |
| 5,473,322 A | 12/1995 | Carney | 340/870.02 |

| | | | |
|---|---|---|---|
| 5,475,742 A | 12/1995 | Gilbert ..................... 379/106 |
| 5,475,867 A | 12/1995 | Blum ........................ 455/53.1 |
| 5,479,442 A | 12/1995 | Yamamoto ................. 375/206 |
| 5,481,259 A | 1/1996 | Bane ..................... 340/870.03 |
| 5,488,608 A | 1/1996 | Flammer, III ............ 370/85.13 |
| 5,491,473 A | 2/1996 | Gilbert .................. 340/870.01 |
| 5,493,287 A | 2/1996 | Ane ....................... 340/825.52 |
| 5,495,239 A | 2/1996 | Ouellette ............... 340/870.02 |
| 5,497,424 A | 3/1996 | Vanderpool ................... 380/34 |
| 5,499,243 A | 3/1996 | Hall ........................ 370/85.8 |
| 5,500,871 A | 3/1996 | Kato et al. ................. 375/208 |
| 5,511,188 A | 4/1996 | Pascucci et al. ............ 395/600 |
| 5,519,388 A | 5/1996 | Adair, Jr. ............... 340/870.02 |
| 5,521,910 A | 5/1996 | Matthews .................... 370/54 |
| 5,522,044 A | 5/1996 | Pascucci et al. ........ 395/200.06 |
| 5,524,280 A | 6/1996 | Douthitt et al. .............. 455/62 |
| 5,525,898 A | 6/1996 | Lee, Jr. et al. ............. 324/142 |
| 5,526,389 A | 6/1996 | Buell et al. ................. 375/200 |
| 5,528,507 A | 6/1996 | McNamara et al. ........ 364/483 |
| 5,528,597 A | 6/1996 | Gerszberg et al. ......... 370/95.3 |
| 5,539,775 A | 7/1996 | Tuttle et al. ................ 375/200 |
| 5,541,589 A | 7/1996 | Delaney ................ 340/870.02 |
| 5,544,036 A | 8/1996 | Brown, Jr. et al. ......... 364/145 |
| 5,546,424 A | 8/1996 | Miyake .................... 375/206 |
| 5,548,527 A | 8/1996 | Hemminger et al. ........ 364/492 |
| 5,548,633 A | 8/1996 | Kujawa et al. ............... 379/93 |
| 5,553,094 A | 9/1996 | Johnson et al. ............. 375/200 |
| 5,555,508 A | 9/1996 | Munday et al. ............. 364/492 |
| 5,559,870 A | 9/1996 | Patton et al. ............... 379/107 |
| 5,566,332 A | 10/1996 | Adair et al. ................. 395/600 |
| 5,570,084 A | 10/1996 | Ritter et al. ............ 340/825.05 |
| 5,572,438 A | 11/1996 | Ehlers et al. ............... 364/492 |
| 5,574,657 A | 11/1996 | Tofte ........................ 364/510 |
| 5,590,179 A | 12/1996 | Shincovich et al. ........ 379/107 |
| 5,592,470 A | 1/1997 | Rudrapatna et al. ........ 370/320 |
| 5,594,740 A | 1/1997 | LaDue ........................ 379/59 |
| 5,602,744 A | 2/1997 | Meek et al. ........... 364/464.22 |
| 5,617,084 A | 4/1997 | Sears ......................... 331/176 |
| 5,619,192 A | 4/1997 | Ayala .................... 340/870.02 |
| 5,619,685 A | 4/1997 | Schiavone ................. 395/500 |
| 5,621,629 A | 4/1997 | Hemminer et al. ........... 363/56 |
| 5,627,759 A | 5/1997 | Bearden et al. ............. 364/483 |
| 5,631,636 A | 5/1997 | Bane ..................... 340/825.69 |
| 5,636,216 A | 6/1997 | Fox et al. ................... 370/402 |
| 5,640,679 A | 6/1997 | Lundqvist et al. .......... 455/33.2 |
| 5,659,300 A | 8/1997 | Dresselhuys et al. .. 340/870.02 |
| 5,668,803 A | 9/1997 | Tymes et al. ................ 370/312 |
| 5,668,828 A | 9/1997 | Sanderford, Jr. et al. ... 375/202 |
| 5,673,252 A | 9/1997 | Johnson et al. ............. 370/449 |
| 5,684,472 A | 11/1997 | Bane ..................... 340/870.02 |
| 5,684,799 A | 11/1997 | Bigham et al. ............. 370/397 |
| 5,691,715 A | 11/1997 | Ouellette ............... 340/870.09 |
| 5,692,180 A | 11/1997 | Lee ............................ 395/610 |
| 5,696,501 A | 12/1997 | Ouellette et al. ...... 340/870.02 |
| 5,696,765 A | 12/1997 | Safadi ........................ 370/436 |
| 5,696,903 A | 12/1997 | Mahany ................. 395/200.58 |
| 5,699,276 A | 12/1997 | Roos ..................... 364/514 A |
| 5,714,931 A | 2/1998 | Petite et al. ................. 340/539 |
| 5,715,390 A | 2/1998 | Hoffman et al. ........ 395/188.01 |
| 5,717,604 A | 2/1998 | Wiggins .................. 364/514 C |
| 5,719,564 A | 2/1998 | Sears ..................... 340/870.02 |
| 5,732,078 A | 3/1998 | Arango ..................... 370/355 |
| 5,745,901 A | 4/1998 | Entner et al. ............... 707/103 |
| 5,748,104 A | 5/1998 | Argyroudis et al. ... 340/870.11 |
| 5,748,619 A | 5/1998 | Meier ........................ 370/278 |
| 5,751,914 A | 5/1998 | Coley et al. .................. 395/51 |
| 5,751,961 A | 5/1998 | Smyk .................... 395/200.47 |
| 5,754,772 A | 5/1998 | Leaf ...................... 395/200.33 |
| 5,754,830 A | 5/1998 | Butts et al. ................. 395/500 |
| 5,757,783 A | 5/1998 | Eng et al. ................... 370/315 |
| 5,768,148 A | 6/1998 | Murphy et al. ............. 364/492 |
| 5,778,368 A | 7/1998 | Hogan et al. ................. 707/10 |
| 5,787,437 A | 7/1998 | Potterveld et al. .......... 707/103 |
| 5,790,789 A | 8/1998 | Suarez .................. 395/200.32 |
| 5,790,809 A | 8/1998 | Holmes ................. 395/200.58 |
| 5,801,643 A | 9/1998 | Williams et al. ........ 340/870.02 |
| 5,805,712 A | 9/1998 | Davis .......................... 380/50 |
| 5,808,558 A | 9/1998 | Meek et al. ........... 340/870.01 |
| 5,809,059 A | 9/1998 | Souissi et al. ............... 375/202 |
| 5,822,521 A | 10/1998 | Gartner et al. ........... 395/200.6 |
| 5,850,187 A | 12/1998 | Carrender et al. ........ 340/10.42 |
| 5,862,391 A | 1/1999 | Salas et al. ............. 395/750.01 |
| 5,872,774 A | 2/1999 | Wheatley, III et al. ..... 370/335 |
| 5,874,903 A | 2/1999 | Shuey et al. ........... 340/870.02 |
| 5,875,183 A | 2/1999 | Nitadori ..................... 370/328 |
| 5,875,402 A | 2/1999 | Yamawaki .................. 455/502 |
| 5,884,184 A | 3/1999 | Sheffer ....................... 455/521 |
| 5,892,758 A | 4/1999 | Argyroudis ................. 370/335 |
| 5,896,382 A | 4/1999 | Davis et al. ................. 370/401 |
| 5,897,607 A | 4/1999 | Jenney et al. ................. 702/62 |
| 5,898,387 A | 4/1999 | Davis et al. ............ 340/870.02 |
| 5,907,491 A | 5/1999 | Canada et al. .......... 364/468.15 |
| 5,907,540 A | 5/1999 | Hayashi ...................... 370/315 |
| 5,910,799 A | 6/1999 | Carpenter et al. ........... 345/333 |
| 5,923,269 A | 7/1999 | Shuey et al. ........... 340/870.02 |
| 5,926,103 A | 7/1999 | Petite .................... 340/825.19 |
| 5,926,531 A | 7/1999 | Petite ......................... 379/144 |
| 5,943,375 A | 8/1999 | Veintimilla ................. 375/355 |
| 5,944,842 A | 8/1999 | Propp et al. ................. 714/701 |
| 5,953,319 A | 9/1999 | Dutta et al. ................. 370/238 |
| 5,959,550 A | 9/1999 | Giles ..................... 340/870.02 |
| 5,960,074 A | 9/1999 | Clark ......................... 379/310 |
| 5,963,146 A | 10/1999 | Johnson et al. ........... 340/870.1 |
| 5,974,236 A | 10/1999 | Sherman ................ 395/200.51 |
| 5,986,574 A | 11/1999 | Colton ................... 340/870.02 |
| 6,000,034 A | 12/1999 | Lightbody et al. .......... 713/202 |
| 6,028,522 A | 2/2000 | Petite ......................... 340/641 |
| 6,034,988 A | 3/2000 | VanderMey et al. ........ 375/202 |
| 6,035,201 A | 3/2000 | Whitehead .................. 455/455 |
| 6,041,056 A | 3/2000 | Bigham et al. ............. 370/395 |
| 6,061,604 A | 5/2000 | Russ et al. ..................... 700/90 |
| 6,067,029 A | 5/2000 | Durston .................. 340/870.03 |
| 6,073,169 A | 6/2000 | Shuey et al. ................ 709/217 |
| 6,073,174 A | 6/2000 | Montgomerie et al. ..... 709/224 |
| 6,078,251 A | 6/2000 | Landt et al. .............. 340/10.41 |
| 6,078,785 A | 6/2000 | Bush ............................ 455/7 |
| 6,078,909 A | 6/2000 | Knutson ....................... 705/59 |
| 6,088,659 A | 7/2000 | Kelley et al. ................. 702/62 |
| 6,091,758 A | 7/2000 | Ciccone et al. ............. 375/132 |
| 6,100,817 A | 8/2000 | Mason, Jr. et al. ..... 340/870.02 |
| 6,112,192 A | 8/2000 | Capek ......................... 705/59 |
| 6,124,806 A | 9/2000 | Cunningham et al. . 340/870.02 |
| 6,128,276 A | 10/2000 | Agee ......................... 370/288 |
| 6,137,423 A | 10/2000 | Glorioso et al. ........ 340/870.02 |
| 6,150,955 A | 11/2000 | Tracy et al. ............ 340/870.02 |
| 6,154,487 A | 11/2000 | Murai et al. ................. 375/150 |
| 6,160,993 A | 12/2000 | Wilson ....................... 455/12.1 |
| 6,172,616 B1 | 1/2001 | Johnson et al. ......... 340/870.12 |
| 6,195,018 B1 * | 2/2001 | Ragle et al. ............ 340/870.01 |
| 6,199,068 B1 | 3/2001 | Carpenter ................... 707/100 |
| 6,208,266 B1 | 3/2001 | Lyons et al. ............ 340/870.02 |
| 6,218,953 B1 | 4/2001 | Petite ......................... 340/641 |
| 6,233,327 B1 | 5/2001 | Petite ......................... 379/155 |
| 6,246,677 B1 | 6/2001 | Nap et al. ................... 370/346 |
| 6,249,516 B1 | 6/2001 | Brownrigg et al. .......... 370/338 |
| 6,259,972 B1 * | 7/2001 | Sumic et al. ................ 700/286 |
| 6,333,975 B1 | 12/2001 | Brunn et al. ............ 379/106.03 |
| 6,363,057 B1 | 3/2002 | Ardalan et al. ............. 370/252 |
| 6,393,341 B1 | 5/2002 | Lawrence et al. ........... 700/286 |
| 6,396,839 B1 | 5/2002 | Ardalan et al. ............. 370/401 |
| 6,421,731 B1 | 7/2002 | Ciotti, Jr. et al. ............ 709/238 |
| 6,430,268 B1 | 8/2002 | Petite ........................... 379/39 |
| 6,437,692 B1 | 8/2002 | Petite et al. ................. 340/540 |
| 6,446,192 B1 | 9/2002 | Narasimhan et al. ......... 712/29 |
| 6,643,278 B1 | 11/2003 | Panasik et al. .............. 370/330 |
| 6,657,549 B1 | 12/2003 | Avery .................... 340/825.49 |

| | | | | |
|---|---|---|---|---|
| 6,684,245 | B1 | 1/2004 | Shuey et al. | 709/223 |
| 6,751,563 | B2 | 6/2004 | Spanier et al. | 702/61 |
| 6,867,707 | B1 | 3/2005 | Kelley et al. | 340/870.02 |
| 6,963,285 | B2* | 11/2005 | Fischer et al. | 340/635 |
| 2001/0002210 | A1 | 5/2001 | Petite | 379/155 |
| 2001/0024163 | A1 | 9/2001 | Petite | 340/628 |
| 2002/0012323 | A1 | 1/2002 | Petite et al. | 370/252 |
| 2002/0013679 | A1 | 1/2002 | Petite | 702/188 |
| 2002/0019712 | A1 | 2/2002 | Petite et al. | 702/61 |
| 2002/0019725 | A1 | 2/2002 | Petite | 702/188 |
| 2002/0026957 | A1 | 3/2002 | Reyman | 137/39 |
| 2002/0027504 | A1 | 3/2002 | Davis et al. | 340/540 |
| 2002/0031101 | A1 | 3/2002 | Petite et al. | 370/310 |
| 2002/0094799 | A1 | 7/2002 | Elliott et al. | 455/405 |
| 2002/0125998 | A1 | 9/2002 | Petite et al. | 340/286.01 |
| 2002/0145537 | A1 | 10/2002 | Mueller et al. | 340/870.02 |
| 2002/0169643 | A1 | 11/2002 | Petite et al. | 705/5 |
| 2003/0036810 | A1 | 2/2003 | Petite | 700/9 |
| 2003/0036822 | A1 | 2/2003 | Davis et al. | 700/295 |
| 2003/0123442 | A1 | 7/2003 | Drucker et al. | 370/392 |
| 2003/0202512 | A1 | 10/2003 | Kennedy | 370/389 |
| 2004/0001008 | A1* | 1/2004 | Shuey et al. | 340/870.02 |
| 2004/0061616 | A1 | 4/2004 | Fischer et al. | 340/657 |
| 2004/0113810 | A1 | 6/2004 | Mason, Jr. et al. | 340/870.02 |
| 2004/0236620 | A1* | 11/2004 | Chauhan et al. | 705/9 |
| 2005/0086341 | A1* | 4/2005 | Enga et al. | 709/224 |
| 2005/0184881 | A1 | 8/2005 | Dusenberry et al. | 340/870.02 |
| 2005/0270173 | A1 | 12/2005 | Boaz | 340/870.02 |
| 2006/0004679 | A1* | 1/2006 | Cahill-O'Brien et al. | 705/412 |

FOREIGN PATENT DOCUMENTS

| | | |
|---|---|---|
| EP | 0 395 495 A1 | 10/1990 |
| EP | 0 446 979 A1 | 9/1991 |
| EP | 0 629 098 A2 | 12/1994 |
| GB | 2 118 340 A | 10/1983 |
| GB | 2 157 448 A | 10/1985 |
| GB | 2 186 404 A | 8/1987 |
| GB | 02 222 898 A | 3/1990 |
| GB | 2 237 910 A | 5/1991 |
| JP | 4290593 A | 10/1992 |
| JP | 8194023 A | 7/1996 |
| WO | 93/02515 A1 | 2/1993 |
| WO | 93/04451 A1 | 3/1993 |
| WO | 95/32595 A1 | 11/1995 |
| WO | 96/10856 A1 | 4/1996 |
| WO | WO2004003772 A1 * | 1/2004 |

OTHER PUBLICATIONS

Sridharan et al., "Outage management through AMR systems using an intelligent data filter", Oct. 2001, IEEE, IEEE Transactions on Power Delivery, vol. 16, issue 4, pp. 669-675.*

Desbonnet, Joe et al., "System Architecture and Implementation of CEBus/Internet Gateway", *IEEE*, 1997, 1057-1062, no month.

Markwalter, Brian et al., "CEBus Network Layer Description", *IEEE*, 1989, 571-575, no month.

Newtown, Harry, *Newton's Telecom Dictionary*, Flatiron Publishing, Inc., *10th Ed.*, 1996, LAN (1 of 1): Cebus Overview (1-3): Cebus Industry Council (1 of 1), no month.

Newtown, Harry, *Newton's Telecom Dictionary*. 10th Edition, 1996, 243, no month.

International Search Report issued in International Application No. PCT/US98/11170 Date of Mailing: Oct. 7, 1998, 1 page.

Internet Printout, http://www.ram.com BellSouth Wireless Data—Paging, Mobitex, Network, Business, Sep. 23, 1998: —MOBITEX® The Heart of Every BellSouth Solution—MOBITEX Features and Services: RAM Mobile Data White Paper, Feb. 1997—Narrowband PCS Technologies: What are the Options?: RAM Mobile Data White Paper, Nov. 1997—The Inherent Security of Data Over Mobitex Wireless Packet Data Networks, A RAM Mobile Data White Paper, Oct. 1995 —Comparative Analysis of Coverage and Performance: RAM & Ardis, 1998, no month, 25 pages.

Internet Printout, http://www.ardis.com "Ardis Two-Way, Wireless Data Communications," ARDIS, Sep. 23, 1998, 16 pages.

Internet Printout, http://ww.ardis.com/RADIO "An Overview of Radio Coverage," Sep. 29, 1998 "Radio Propagation," Sep. 29, 1998 "Factors Affecting ARDIS Coverage," Sep. 29, 1998 "The ARDIS Network Compared to Other Systems," Sep. 29, 1998, 8 pages.

Internet Printout, http://www.ardis.com/RADIO "Radio Coverage," Sep. 29, 1998 "Glossary of Terms," Sep. 29, 1998 "Radio Propagation in Free Space," Sep. 29, 1998 "Real World Propagation Variations," Sep. 29, 1998 "*Probability of Reception* vs. *Calculation*," Sep. 29, 1998, 9 pages.

"MV-90 Read Only System" UTS Software Solutions For Utility Customers. (No Date). (No Page Nos. or Pages), 3 pages.

Rappaport, T. S. "Wireless Communications, Principles and Practice," Prentice Hall PTR, 1996, pp. 410-413, no month.

Brochure: TRF6900 Single-Chip RF Transceiver, Texas Instrument, 2001© 35 pages, no month.

Norenkov, et al., *Telecommunication Technologies and Networks, Moscow Bauman Technical School*, 1988, (Signed for publication on Dec. 10, 1997), pp. 116-118, 80-87 [1] English Language Abstract Provided.

Brownrigg, E. Ph.D., "Developing the Information Superhighway Issues for Libraries", *Library Perspectives on NREN*, The National Research and Education Network, 1990, 55-63, no month.

Brownrigg, E.B., "The Internet as an External Economy: The Emergence of the Invisible Hand", *Library Administration and Management*, 1991, 95-97, no month.

Frankel, M.S., "Packet Radios Provide Link for Distributed, Survivable C3 in Post-Attack Scenarios", *MSN*, Jun. 1983, 80-108.

Gower, N. et al., "Congestion Control Using Pacing in a Packet Radio Network", *IEEE Military Communications Conference*, 1982, 1, 23.1-1, 23-1-6, no month.

Johnson, D.B., "Routing in Ad Hoc Networks of Mobile Hosts", *IEEE*, 1995, 158-163, no month.

Jubin, J., "Current Packet Radio Networks Protocols", *IEEE Infocom Proceedings*, 1985, 86-92, no month.

Jubin, J. et al., "The DARPA Packet Radio Network Protocols", *Proceedings of the IEEE*, 1987, 75(1), 21-32, no month.

Kahn, R.E., "The Organization of Computer Resources into a Packet Radio Network",*IEEE Transactions on Communications*, 1977, 25(1), 169-178, no month.

Kahn, R.E. et al., "Advances in Packet Radio Technology", *proceedings of the IEEE*, 1978, 66(11), 1468-1496, no month.

Lauer, G. et al., "Survivable Protocols for Large Scale Packet Radio Networks", *IEEE Global Telecommunications Conference*, 1984, 468-471, no month.

Lynch, C.A. et al., "Electronic Publishing, Electronic Imaging, and Document Delivery", *Electronic Imaging, International Electronic Imaging Exposition & Conference*, 1986, 662-663, no month, pp. 666, 677.

Lynch, C.A. et al., "The Telecommunications Landscape", 1986, 7 pages, no month.

Lynch, C.A. et al., "Routing, Repeating, Power Control and Directional Techniques", *Packet Radio Networks*, Architectures, Protocols, Technologies and Applications, 1987, Ch 5, 105-129, 259-274, no month.

MacGregor, W. et al., "Multiple Control Stations in Packet Radio Networks", *IEEE Military Communications Conference*, 1982, 10.3-1-10.3-5, no month.

Shachan, N. et al., "A Packet Radio Network for Library Automation", *IEEE Military Communications Conference*, 1987, 2,21.3.1-21.3.7, no month.

Shacham, N. et al., "Future Directions in Packet Radio Technology", *IEEE Infocom Proceedings*, 1985, 93-98.

Westcott, J.A., "Issues in Distributed Routing for Mobile Packet Radio Networks", *IEEE*, 1982, 233-238, no month.

Wescott, J. et al., "A Distributed Routing Design for a Broadcast Environment", *IEEE Military Communications Conference*, 1982, 10.4-1-10.4-5, no month.

"Packet Radio: Applications for Libraries in Developing Countries", *UDT Series on Data Communication Technologies and Standards for Libraries*, 1993, Ch 1-6, 87 pages, no month.

Chlamtac, I. et al., "Optimizing the System of Virtual Paths", *IEEE ACM Transactions on Networking*, 1994, 2(6), 581-586, no month.

Leung, V.C.M., "Internetworking Wireless Terminals to Local Area Networks Via Radio Bridges", *ICWC*, 1992, 126-129, no month.

Pollini, G.P. et al., "Path Optimization Procedures for Efficient Routing of Information after an Inter-Switch Handover", *IEEE*, 1994, 1-5, no month.

Rajagopalan, B. et al., "A New Responsive Distributed Shortest-Path Routing Algorithm", *ACM*, 1989, 237-246, no month.

Corcoran, P.M. et al., "CEBus Network Access via the World-Wide-Web", *International Conference on Consumer Electronics*, Jun. 5-7, 1996, 236-237, XP-002218722.

Corcoran, P.M. et al. "Browser-Style Interfaces to a Home Automation Network", *IEEE Trans. On Consumer Electronics*, Nov. 1, 1997, 43(4), XP-000768559, pp. 1063, 1065, 1067, 1069.

International Search Report issued in International Application No. PCT/US98/19034 Date of Mailing: Feb. 1, 1999.

* cited by examiner

USING A FIXED NETWORK WIRELESS DATA COLLECTION SYSTEM TO IMPROVE UTILITY RESPONSIVENESS TO POWER OUTAGES

CROSS-REFERENCE TO RELATED APPLICATIONS

This application claims the benefit of priority of U.S. Provisional Patent Application No. 60/664,042, filed Mar. 22, 2005.

FIELD OF THE INVENTION

The present invention relates to wireless networks for collecting data, and more particularly, to systems and methods for monitoring utility system outages using a fixed network wireless data collection system to improve a utility's response thereto.

BACKGROUND OF THE INVENTION

The collection of meter data from electrical energy, water, and gas meters has traditionally been performed by human meter-readers. The meter-reader travels to the meter location, which is frequently on the customer's premises, visually inspects the meter, and records the reading. The meter-reader may be prevented from gaining access to the meter as a result of inclement weather or, where the meter is located within the customer's premises, due to an absentee customer. This methodology of meter data collection is labor intensive, prone to human error, and often results in stale and inflexible metering data.

Some meters have been enhanced to include a one-way radio transmitter for transmitting metering data to a receiving device. A person collecting meter data that is equipped with an appropriate radio receiver need only come into proximity with a meter to read the meter data and need not visually inspect the meter. Thus, a meter-reader may walk or drive by a meter location to take a meter reading. While this represents an improvement over visiting and visually inspecting each meter, it still requires human involvement in the process.

An automated means for collecting meter data involves a fixed wireless network. Devices such as, for example, repeaters and gateways are permanently affixed on rooftops and pole-tops and strategically positioned to receive data from enhanced meters fitted with radio-transmitters. Typically, these transmitters operate in the 902-928 MHz range and employ Frequency Hopping Spread Spectrum (FHSS) technology to spread the transmitted energy over a large portion of the available bandwidth.

Data is transmitted from the meters to the repeaters and gateways and ultimately communicated to a central location. While fixed wireless networks greatly reduce human involvement in the process of meter reading, such systems require the installation and maintenance of a fixed network of repeaters, gateways, and servers. Identifying an acceptable location for a repeater or server and physically placing the device in the desired location on top of a building or utility pole is a tedious and labor-intensive operation. Furthermore, each meter that is installed in the network needs to be manually configured to communicate with a particular portion of the established network. When a portion of the network fails to operate as intended, human intervention is typically required to test the effected components and reconfigure the network to return it to operation.

Thus, while existing fixed wireless systems have reduced the need for human involvement in the daily collection of meter data, such systems may provide benefits to utilities by monitoring for system outages. In so doing, fixed wireless systems may improve the utilities response to outages, improving customer service.

SUMMARY OF THE INVENTION

The present invention is directed to methods and systems for determining service outages and restorations that includes an outage management server (OMS) that generates reports of outages and restoration information for metering endpoints. The outages may be caused by faults at various locations in the distribution network. The metering endpoint may include a transmitter having a battery backup that transmits the outage information upon a failure to detect a voltage at the endpoint. The transmission of the information may be filtered based on configurable criteria. The metering endpoints may also inform the OMS when power is restored. Thus, a utility may better service its customers by focusing manpower efforts using the outage and restoration information generated by the OMS.

In accordance with the present invention, there is provided a system for determining outage and restoration information for meters operating within a fixed wireless metering network. The system includes a network configuration server that determines a network states; and an outage management system (OMS) that determines outage conditions and power restoration conditions. The OMS may provide a list of meters affected by the power outage and restoration conditions.

The system may also include a collector and non-collector metering points. The non-collector metering points may collect and forward the outage information to the collector. The collector and the non-collector metering points may perform filtering of the outage information. The filtering may comprise at least one of: configurable delays at the non-collector metering points prior to transmitting an outage message, configurable delays at the non-collector metering points prior to transmitting a restoration message, configurable options in the collector that allow data to be aggregated prior to a call-in to the outage management system, and configurable options in the collector that allow call-ins to be suppressed during a large-scale outage.

The non-collector metering points may also select a random transmit slot within a first transmit period, a second transmit period, and a third transmit period.

The non-collector metering points and the collector may be adapted to verify a presence of power by measuring a voltage.

A subset of affected metering points may be identified, and the subset of affected metering points assigned to a corresponding subset of collectors for verification of power outage or power restoration.

The collector may be adapted to ping the non-collector metering points to determine an extent of the outage, wherein the ping comprises one of: a ping of each non-collector metering point directly, a ping of non-collector metering points in a communication path to determine if the communication path is available, and a ping of non-collector metering points farthest from the collector first in an attempt to validate all non-collector metering points in the communication path with one message.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary systems and methods for gathering meter data are described below with reference to FIGS. 1-3. It will be appreciated by those of ordinary skill in the art that the description given herein with respect to those figures is for exemplary purposes only and is not intended in any way to limit the scope of potential embodiments.

Generally, a plurality of meter devices, which operate to track usage of a service or commodity such as, for example, electricity, water, and gas, are operable to wirelessly communicate with each other. A collector is operable to automatically identify and register meters for communication with the collector. When a meter is installed, the meter registers with a collector that can provide a communication path to the meter. The collectors receive and compile metering data from a plurality of meter devices via wireless communications. A communications server communicates with the collectors to retrieve the compiled meter data.

Figure 1:
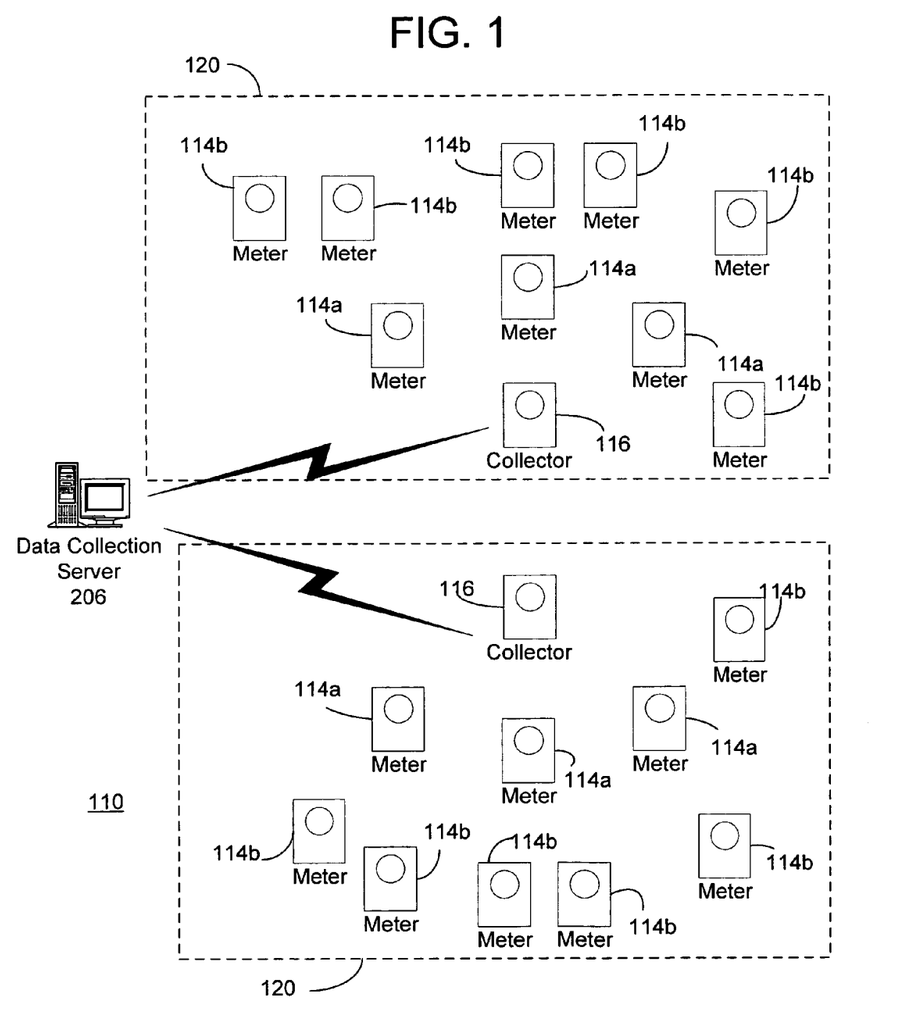
FIG. 1 is a diagram of a wireless system for collecting data from remote devices.

FIG. 1 provides a diagram of an exemplary metering system 110. System 110 comprises a plurality of meters 114, which are operable to sense and record usage of a service or commodity such as, for example, electricity, water, or gas. Meters 114 may be located at customer premises such as, for example, a home or place of business. Meters 114 comprise an antenna and are operable to transmit data, including service usage data, wirelessly. Meters 114 may be further operable to receive data wirelessly as well. In an illustrative embodiment, meters 114 may be, for example, electrical meters manufactured by Elster Electricity, LLC.

System 110 further comprises collectors 116. Collectors 116 are also meters operable to detect and record usage of a service or commodity such as, for example, electricity, water, or gas. Collectors 116 comprise an antenna and are operable to send and receive data wirelessly. In particular, collectors 116 are operable to send data to and receive data from meters 114. In an illustrative embodiment, collectors 116 may be, for example, an electrical meter manufactured by Elster Electricity, LLC.

A collector 116 and the meters 114 for which it is configured to receive meter data define a subnet/LAN 120 of system 110. As used herein, meters 114 and collectors 116 may be considered as nodes in the subnet 120. For each subnet/LAN 120, data is collected at collector 116 and periodically transmitted to a data collection server 206. The data collection server 206 stores the data for analysis and preparation of bills. The data collection server 206 may be a specially programmed general purpose computing system and may communicate with collectors 116 wirelessly or via a wire line connection such as, for example, a dial-up telephone connection or fixed wire network.

Generally, collector 116 and meters 114 communicate with and amongst one another using any one of several robust wireless techniques such as, for example, frequency hopping spread spectrum (FHSS) and direct sequence spread spectrum (DSSS). As illustrated, meters 114a are "first level" meters that communicate with collector 116, whereas meters 114b are higher level meters that communicate with other meters in the network that forward information to the collector 116.

Figure 2:
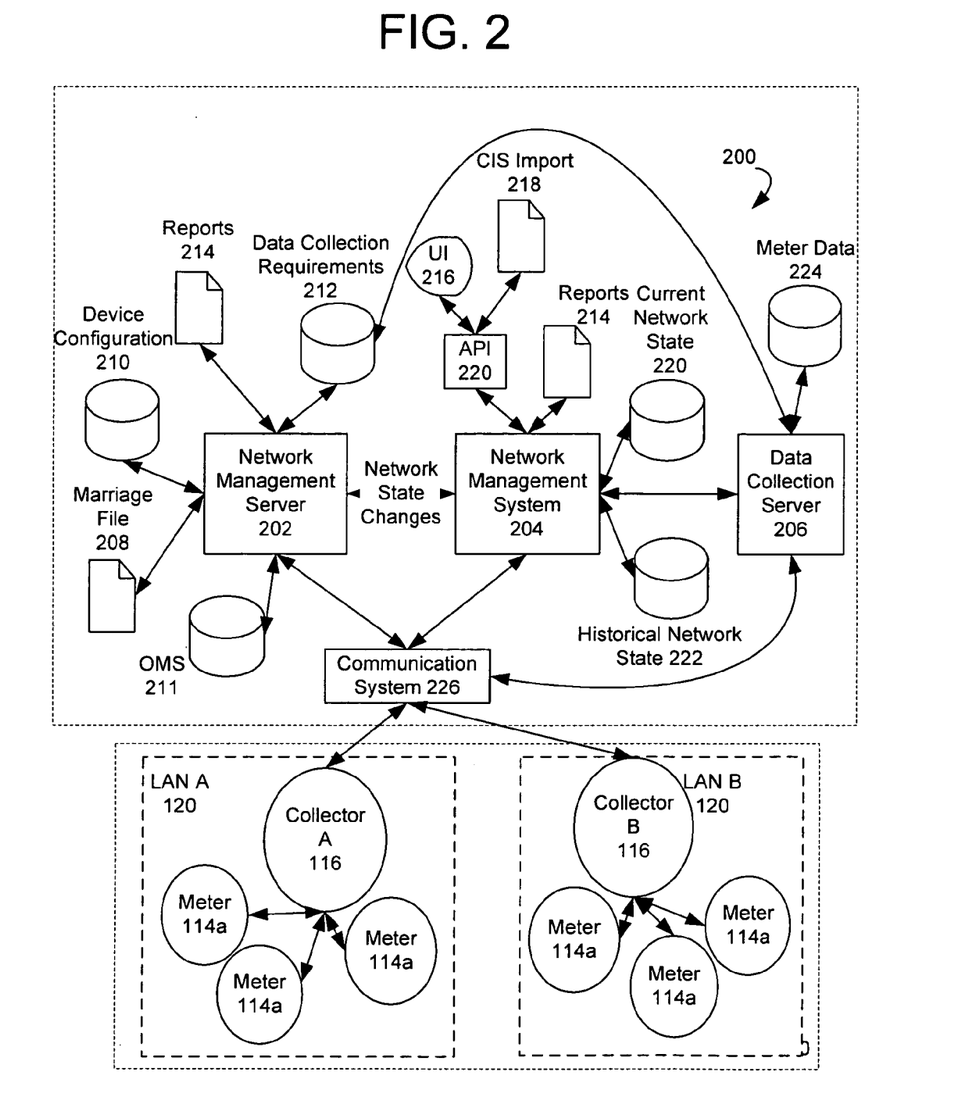
FIG. 2 expands upon the diagram of FIG. 1 and illustrates a system in which the present invention is embodied.

Referring now to FIG. 2, there is illustrated a system 200 in which the present invention may be embodied. The system 200 includes a network management server (NMS)/metering automation server (MAS) 202 (the two terms are used interchangeably herein), a network management system (NMS) 204 and a data collection server 206 that together manage one or more subnets/LANs 120 and their constituent nodes. The NMS 204 tracks changes in network state, such as new nodes registering/unregistering with the system 200, node communication paths changing, etc. This information is collected for each subnet/LAN 120 and are detected and forwarded to the network management server 202 and data collection server 206.

In accordance with an aspect of the invention, communication between nodes and the system 200 is accomplished using the LAN ID, however it is preferable for customers to query and communicate with nodes using their own identifier. To this end, a marriage file 208 may be used to correlate a customer serial number, a manufacturer serial number and LAN ID for each node (e.g., meters 114a and collectors 116) in the subnet/LAN 120. A device configuration database 210 stores configuration information regarding the nodes. For example, in the metering system 110, the device configuration database may include data regarding time of use (TOU) switchpoints, etc. for the meters 114a and collectors 116 communicating to the system 200. A data collection requirements database 212 contains information regarding the data to be collected on a per node basis. For example, a user may specify that metering data such as load profile, demand, TOU, etc. is to be collected from particular meter(s) 114a. Reports 214 containing information on the network configuration may be automatically generated or in accordance with a user request.

The network management system (NMS) 204 maintains a database describing the current state of the global fixed network system (current network state 220) and a database describing the historical state of the system (historical network state 222). The current network state 220 contains data regarding current meter to collector assignments, etc. for each subnet/LAN 120. The historical network state 222 is a database from which the state of the network at a particular point in the past can be reconstructed. The NMS 204 is responsible for, amongst other things, providing reports 214 about the state of the network. The NMS 204 may be accessed via an API 220 that is exposed to a user interface 216 and a Customer Information System (CIS) 218. Other external interfaces may be implemented in accordance with the present invention. In addition, the data collection requirements stored in the database 212 may be set via the user interface 216 or CIS 218.

The data collection server 206 collects data from the nodes (e.g., collectors 116) and stores the data in a database 224. The data includes metering information, such as energy consumption and may be used for billing purposes, etc. by a utility provider.

The network management server 202, network management system 204 and data collection server 206 communicate with the nodes in each subnet/LAN 120 via a communication system 226. The communication system 226 may be a Frequency Hopping Spread Spectrum radio network, a mesh network, a Wi-Fi (802.11) network, a Wi-Max (802.16) network, a land line (POTS) network, etc., or any combination of the above and enables the system 200 to communicate with the metering system 110.

The mesh network automatically builds and re-configures itself, based on the most reliable communications paths, with each meter being able to function as a repeater if needed. While the mesh radio network provides robust communications to the end-point meters, and allows for communication paths to change if communications are obstructed, the communication network generally does not correspond to the physical distribution circuit.

The overall system of FIG. 2 includes such features as two-way communications to and from each electricity meter 114a/b. This enables on-request verification of communications to an individual meter or to a group of meters, on-request retrieval of meter data, remote meter re-configuration, critical tier pricing, and remote actions such as service disconnect. The system operates over an intelligent meter communications mesh network for path diversity and self healing. The Metering Automation Server (MAS) unifies the mesh communication network, schedules meter data collection and billing dates, and provides meter network management information. Billing data may be calculated by and stored in the meter 114a/b. The meter has data processing for functions such as Time-of-Use (TOU) metering, demand calculations, sum or net metering, and load profile data. The system architecture allows for new utility applications such as demand response or demand side management programs, energy management or home automation systems, and distribution automation.

The system 200 consists of three levels: the Metering Automation Server (MAS)/Network Management Server 202 for operation and data collection, the collectors 116, and electric meters with integrated two-way 900 MHz radios for residential and commercial metering. The system 200 may comprise the EnergyAxis system available from Elster Electricity LLC, Raleigh, N.C. The collectors 116 may comprise an A3 ALPHA Meter and the meters 114a/114b may comprise A3 ALPHA or REX meters, which are available from Elster Electricity LLC, Raleigh, N.C.

The system 200 may be used to determine an outage and aiding a utility's response thereto. Utilities continue to look for ways to improve customer service while reducing operating costs. The use of a wireless data collection system 200 can help achieve both goals. One area the utilities may seek to improve is customer service when an outage occurs. A second area is the efficient utilization of manpower to restore power. The present invention implants features in the system 200 to improve customer service and the efficiency of manpower utilization during outages.

The word "outage" may have different meanings depending on who is analyzing the event. IEEE 1159 defines an interruption in categories depending on the voltage variation (in per unit) and duration as shown in Table 1 below.

TABLE 1

| Category | Typical Duration | Typical Voltage Variation |
| --- | --- | --- |
| Interruption, Sustained | >1 min | 0.0 pu |
| Interruption, Temporary | 3 s-1 m | <0.1 pu |
| Interruption, Momentary | 0.5 s-3 s | <0.1 pu |

Utilities may also have their own definition for an outage. While momentary and temporary outages are useful in power quality analysis, they are not of interest to utility personnel responsible for power restoration. A sustained interruption occurs when a fault has been cleared by a fuse, recloser, or circuit breaker and it results in an outage for customers downstream of the protective device. It is the sustained outage that has the greatest impact on customers.

Sources of an Outage

A customer outage can be caused by several different events. While an outage is typically caused by the clearing of a fault on the distribution system, it may also be caused by a fault or open circuit on the customer premises. FIG. 3 shows a typical distribution circuit with various fault locations that could result in a customer outage. For each of the faults shown, the clearing mechanism and customer impact are summarized.

Fault at F1: For a fault at F1, the fault is on the customer premises 300 and is cleared by an in-home circuit breaker resulting in a loss of power for the customer. Only one customer is affected.

Fault at F2: For a fault at F2, the fault is on distribution line 302 between a fused transformer and the customer premises 300 and would be cleared by the transformer fuse. Typically one to three customers are affected.

Fault at F3: For a fault at F3, the fault is on the distribution lateral 304 and is cleared by a fuse on the distribution lateral 304. Typically, at least one hundred customers are affected.

Fault at F4: For a fault at F4, the fault is on the distribution line 306 and would be cleared by a line recloser or station breaker with reclosing relay. Typically, at least three hundred customers are affected.

Fault at F5: For a fault at F5, the fault is on the transmission line 308 and would be cleared by a station breaker. Typically, at least one thousand customers are affected.

Utility Response to an Outage

Following an outage on the distribution grid, utilities want to be able to restore power to customers in as timely a manner as possible. One of the major factors that may influence what type of data a utility wants during an outage is the number of affected customers.

Figure 3:
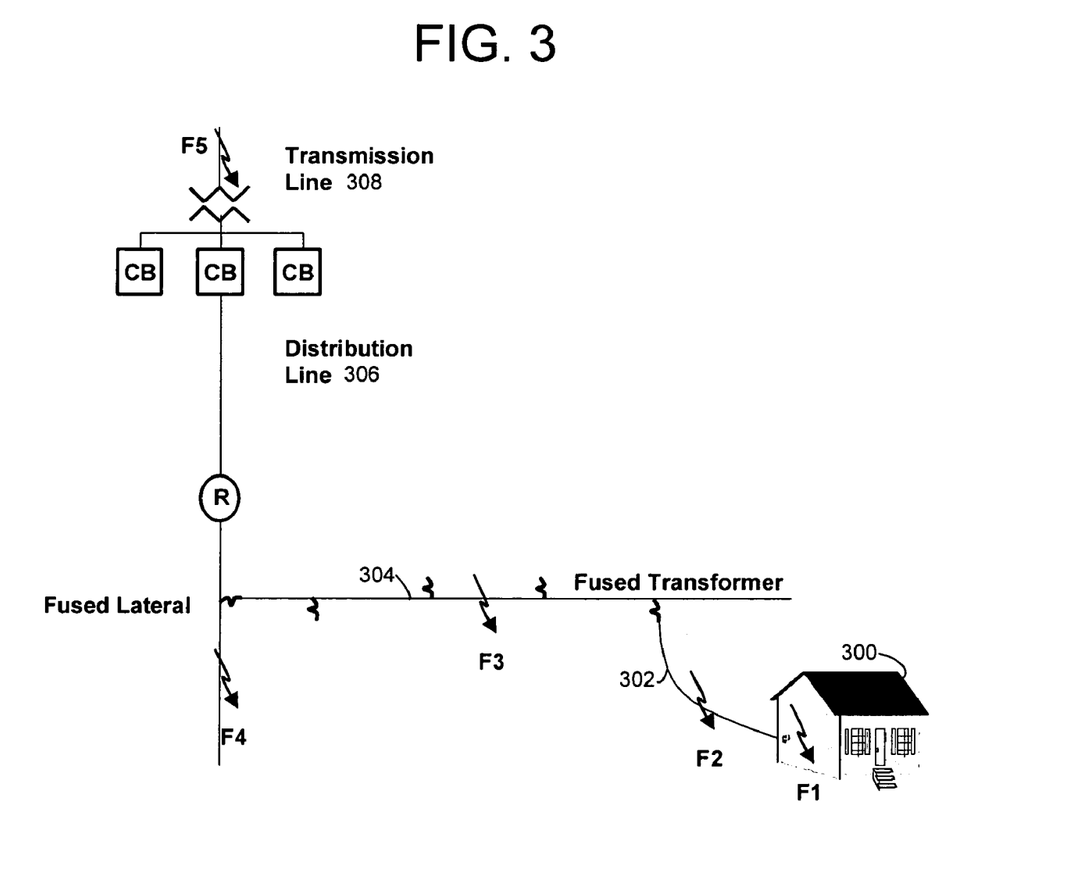
FIG. 3 illustrates a typical distribution circuit and potential fault locations.

As shown in FIG. 3, the location of the fault impacts the numbers of customers affected. When the number of affected customers is small, the likelihood of the outage being reported is small. This is particularly true of homes that are not occupied at the time of the outage (e.g. vacation homes or locations where no one is home at the time of the outage). Notification is therefore important so that the outage may be recognized and repair crews dispatched. For faults involving a large number of customers, the utility is more likely to receive calls from some of those customers. A large-scale outage often results in an overload of the trouble call system due to the large number of customers reporting the outage. In this case, the initial notification is less important, but it is important to verify that power has been restored to all customers.

The data for utilities as a function of fault location is summarized in Table 2.

TABLE 2

Utility Drivers Depending on Fault Location

| Fault | Customers Affected | Probability of Utility Knowledge of Outage Within 30 Minutes | Utility Driver |
|---|---|---|---|
| F1 | 1 | Variable* | Knowledge of outage |
| F2 | 1-3 | Variable* | Knowledge of outage |
| F3 | >100 | Good | Knowledge that all customers restored |
| F4 | >300 | Very Good | Knowledge that all customers restored |
| F5 | >1000 | Near 100% | Knowledge that all customers restored |

*depending on customer being at home

System Response to Outages

In the system 200, the following outage/restoration features are implemented:

1. The collector 116 can provide an outage call to MAS 202 when the collector is affected by an outage.

2. The collector 116 can provide a restoration call to MAS 202 when power is restored to the collector.

3. The meters 114a/b can send a radio frequency (RF) message to notify the collector 116 that power has been restored to the meter site. The collector 116 can make one or more calls to report the restoration information to MAS 202.

4. Once notified of an outage or a restoration condition, the MAS 202 can provide this notification to an Outage Management System (OMS) 211 and to MAS operators.

When equipped with a means to hold up the power supply, an electricity meter end point 114a/b (REX Meter, A3 Node) in the system can transmit an outage message when power fails. The electricity meter 114a/b can be configured to send the message immediately, or after a configurable delay period. The configurable (e.g., 1-255 seconds) delay period would typically be set at the factory, or alternatively could be set via a download from MAS 202 or via customer programming software and an optical communication probe connected to the meter. The meter will only transmit an outage message if the outage lasts longer than the outage delay period. After the delay period, the meter 114a/b will transmit a number of outage messages (e.g., 3) where each outage message is transmitted in a randomly selected transmit slot. In the preferred embodiment, the meter can select from, e.g., 1 of 15 transmit slots.

The outage message transmitted by the electricity meter can be received by any other 2-way node in the system (e.g., 114a or 114b). Each 2-way node has the capability to store multiple messages (e.g., 8) and forward the message to the collector. Multiple nodes in the system may receive the same outage message, thereby increasing the probability that the message is forwarded to the collector. Nodes that receive an outage exception will attempt to forward the message to the collector in an exception window. The node will continue to transmit a message to the collector until the collector acknowledges receipt of the message.

The collector 116 can also detect exception conditions as part of the normal billing read process. When reading billing data from a node 114a/b, the collector 116 will check if the node has any exception data that needs to be forwarded to the collector. If data is available, the collector 116 will read the exception conditions from the node, clearing the condition from the node and causing the node to stop transmitting the condition to the collector 116.

It should be noted that the device transmitting the outage message does not need to be an electricity meter. The device could be a strategically located device, mounted near protective equipment or at a transformer location. It could also be a device installed inside a residence to signify that power has been lost to the site. In the preferred embodiment, the outage notification feature is included in the electricity meter to minimize cost to the utility if all accounts are equipped with the feature. A strategically placed outage notification deployment may be more cost effectively deployed with non-metering devices, and the present invention allows for a strategic deployment.

The collector 116 can be configured to respond in a variety of ways to the receipt of an outage message. The following options can be selected via collector configuration parameters per a particular utility's preferences:

1. Make an immediate call to the MAS 202 after receiving an outage message from an electric meter. While possible, this is not expected to be the likely operating mode for most utilities.

2. Delay for a configurable period of time to allow for the aggregation of outage information from multiple end points, then call to notify MAS 202 regardless of whether power has been restored to some or all of the meters affected by the outage.

3. Delay for a configurable period of time (e.g., 1 to 15 minutes) to allow for the aggregation and filtering of outage and restoration information from multiple end points. After the delay, the collector 116 may initiate a call to MAS 202 if a meter has reported an outage but not yet reported a restoration. To improve the filtering and to limit false alarms, the collector 116 can be configured to poll each meter 114a/b that reported an outage, using a lack of a response as an indication that the outage condition still exists.

4. Aggregate the outage and restoration information as described in options 2 and 3, above, but do not initiate an inbound call if the number of meters in an outage condition exceeds a configurable threshold. This scenario assumes that it is a widespread outage and that customer call-ins will be sufficient to notify of and determine the extent of the outage. The collector filter prevents an overload of information to an Outage Management System (OMS) 211.

The collector 116 may initiate an inbound communication to the MAS 202 to report the outage condition. The MAS 202 will forward the outage information to the outage management system (OMS) 211, which may also receive outage information through customer call-ins to a trouble call center. After receiving the initial report of an outage, either via outage messages from the AMR system or via a customer call, the OMS 211 can use the system 200 to determine the extent of the outage. To do so, the OMS or a distribution operator can provide a list of electric meters that it would like to check for outage conditions. Using a small number of outage reports, the OMS 211 can probe logical points to determine if the outage is of type F2, F3, F4, or F5. The list of meters may be derived from the distribution network topology (i.e., meters on the same feeder, lateral, or service transformer).

After receiving the list of meters from the OMS 211, the MAS 202 determines which collector(s) these meters communicate through and will instruct each identified collector to check for outage conditions on their subset of meters. The collector(s) involved will attempt to verify communications to each end point meter in the list. A lack of communications can be used to indicate a potential outage and communication to a meter will confirm the presence of power. The extent to which the system 200 can probe the outage condition is dependent on which meters in the communication path are powered. Since the network operates in a hierarchical repeater chain, an outage at a repeater/meter at a low level (closer to the collector 116), can affect communications to multiple downstream meters that may not be in an outage condition. As with any RF system, lack of communications to a given device will not always equate to an outage at that device.

If instructed to poll a large number of meters or all meters 114a/b served by the collector 116, the collector 1116 can use various algorithms to optimize the time required to check the list of meters. With a hierarchical system, if a collector 116 is able to communicate with a level farthest away from the collector, the collector 116 will know that all meters in the communication path are powered. Alternatively, the collector 116 could start from the level closest to the collector 116. If unable to communicate to the closest level, the collector knows that it cannot communicate to meters farther down the communication chain.

After polling the meters identified by the MAS 202, the collector 116 updates the list with status information to indicate whether the meter is powered. The status information will indicate that the meter responded (meter is powered), meter did not respond, or meter could not be checked due to a failure in the communication path ahead of the targeted end point. In the case of a communication path failure, the collector may identify the point in the communication path that is not responding, possibly identifying a meter in an outage condition. The MAS 202 may issue the polling request to the collector and wait for the response as soon as it is completed, or it may issue the command to the collector and disconnect the WAN session (i.e., the link between the communication system 226, subnet/LAN A, subnet/LAN B, etc.) without waiting for the response. In this scenario, the collector can be configured to initiate an inbound communication to the MAS 202 to report that the request has completed. The MAS 202 can retrieve the information and pass outage or powered status to the OMS 211 for each of the requested meters. The information available from the OMS 211 can be passed to utility operators and used to direct crews to the outage locations.

In addition to the outage exception message received from a meter, the collector may be configured to determine if an outage condition is present based on the communication success rate to a given meter. In normal operating conditions, the collector periodically communications with each meter to retrieve register (e.g. kWh) data and load profile data. Over time, the collector establishes a communication reliability rate, or performance rate, for each meter. After a minimum number of attempts to communicate to a meter have been made, the collector can determine typical performance rates for a meter flag abnormalities as a potential outage condition. This functionality is illustrated with the following example.

Figure 4:
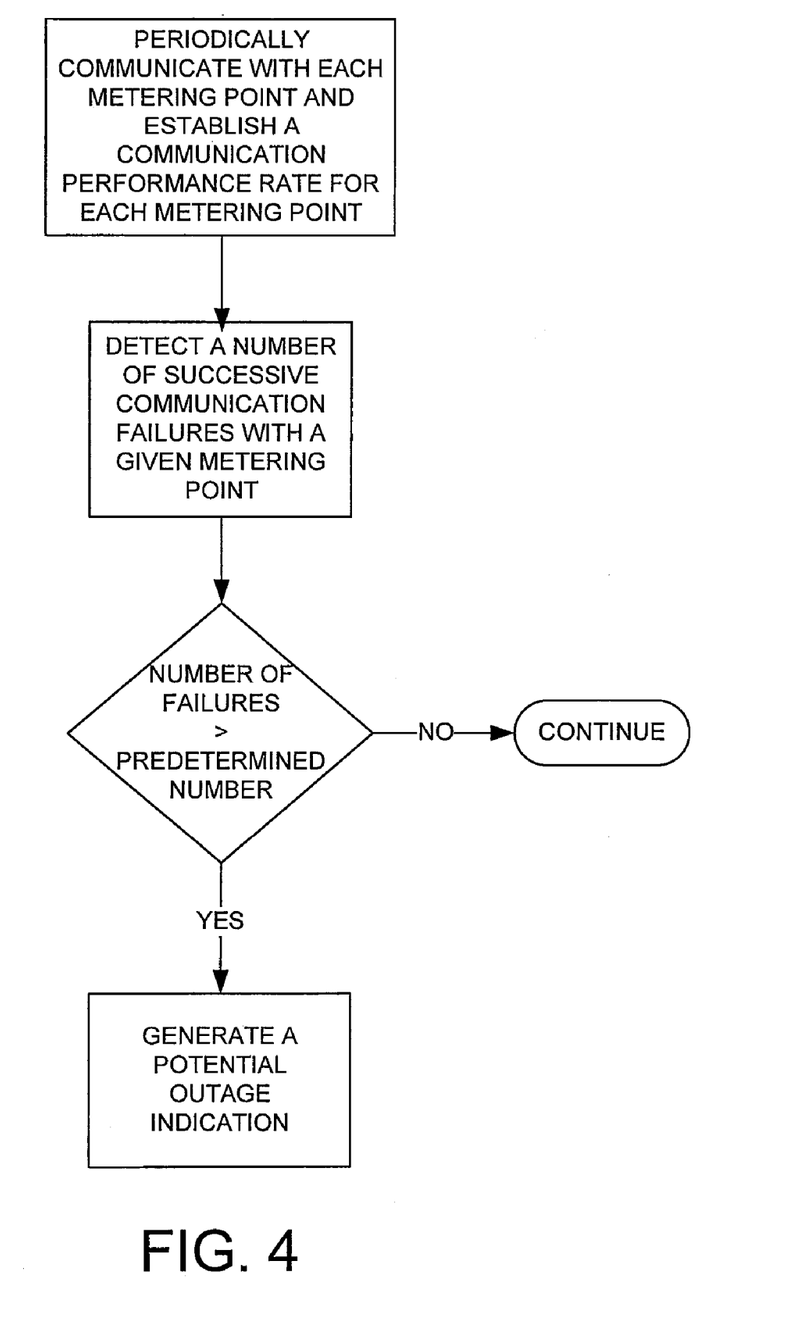
FIG. 4 is a flow chart illustrating one embodiment of a method of the present invention.

After at least 100 communication attempts to a meter, the collector will have a communication performance score (e.g. 90/100) that indicates the likelihood of successful two-way communications between the collector and the meter. If the collector then fails to communicate with the meter on successive attempts, the collector can set a "potential outage" flag to indicate that the meter may be in an outage condition. The number of failed communication attempts required to set the "potential outage" flag is configurable based on the collector to meter communication performance rate. If, for example, the communication performance rate was 100%, two failed communication attempts would cause the collector to set the "potential outage" flag. If, on the other hand, the communication performance rate was 80%, six successive failed communication attempts would be required to set the "potential outage" flag. FIG. 4 is a flow chart illustrating the steps of the foregoing method.

The collector may also delay between successive communication attempts to ensure that a momentary communication problem does not cause the "potential outage" flag to be falsely set. The collector's ability to warn of a potential outage condition provides an outage detection algorithm for cases where metering points are not equipped with a means to transmit outage exception messages. The collector's algorithm can also augment outage detection for systems with outage enabled meters.

When power is restored to the meter 114a/b, the meter may be configured to transmit a power restoration message to the collector 116. To avoid multiple restoration messages from a given meter, the meter can be programmed to delay for a configurable period of time (e.g., 1 to 10 minutes) prior to transmitting the restoration message to the collector 116. The delay in the end point meter prevents a false indication of power restoration, that may occur as reclosers are operating. The collector 116 can be configured to delay for a period of time after receiving the first restoration to allow additional messages to be aggregated prior to initiating a communication to the MAS 202.

Once power is believed to be restored to a site, the OMS in conjunction with MAS 202 can be used to verify that power has been restored to sites that were reported to be in an outage condition. The OMS 211 can use either the restoration information as reported by the end point meter or the OMS 211 can send a list of meters to the collector 116 and request that the collector confirm power restoration to the given list. The verification of power restoration is often times more important to a utility than is the outage reporting, as it allows the utility to optimize restoration crews and provide a positive confirmation to customers and to their systems that power has been restored.

In addition to the features described above, the MAS 202 may provide a Geographic Information System (GIS) based network management component that provides GIS overlay images (shape files) for: the mesh communication paths, event/alarm information, and outage/restoration information. This would provide the utility with geographic shape-file overlays that could be superimposed over their distribution network topology to gain better insight into what is actually happening during an outage event down to the level of each meter/residence. The geographic information that can be provided for visual overlay will include reported outages, reported restorations, polled information to show confirmed power on and probable power out locations. For utilities with an Outage Management System (OMS) 211, the geographic network image could augment the information provided by the OMS 211. For utilities without an OMS, a network image maintained by the system 200 may be used to assist the distribution operators with geographic information to augment other methods and tools used to diagnose outage and restoration efforts.

Exemplary Scenarios

The following examples of outages in the various scenarios help illustrate the outage and restoration process.

Fault at F1:

For a fault at F1, the meter may sense a decrease in voltage due to the fault, but the meter would remain powered after the fault is cleared by the house circuit breaker. If the customer calls the utility to report an outage, the utility may do an on-request read of the meter voltage. Since the REX meter is connected on the source side, it will indicate that voltage is present; allowing the utility to be aware the problem is on the customer site.

Fault at F2:

For a fault at F2, the REX meter would lose power, increment an outage counter, and stop responding to network RF messages. Normal, periodic reads from the collector are not sufficient to quickly signal an outage condition and report the outage to MAS. The probability of the utility becoming quickly aware of the fault due to customer call-ins is not good, unless the meter affected by the outage is equipped with outage notification hardware. If the utility is notified, the outage management system could then determine the extent of the outage by providing a list of suspect meters to MAS. The list of meters would be those around the meters identified by customer call-ins necessary to determine the extent of the outage. Then, MAS would distribute the meter list to the collector or collectors that serve the meters in the list. Each collector would receive a list consisting of only the meters that are a part of its local area network. The customer call-in information would be augmented by the outage information provided by the system, allowing crews to be dispatched in a logical and efficient manner.

Once the fault is cleared and power is restored, the meter transmits a restoration message to the collector and the collector will forward the restoration information to MAS. MAS can then provide this restoration information to an OMS for confirmation of power restoration. The restoration information can be used to confirm outage locations that have been cleared and allow work crews to be focused on areas that have not yet been confirmed restored. In addition to the restoration message from the meter, the OMS can be used to "ping" a meter to verify power restoration after a crew has completed a field repair. The ping to the target meter is made by the source of the ping (e.g., the OMS) to verify that the target meter is powered and responsive.

Fault at F3:

For a fault at F3 (distribution lateral), all meters past the fault point would register an outage and increment their outage counter. Using the assumptions of Table 2, more than 100 electric meters would experience the same event. The probability of the utility becoming quickly aware of the fault due to customer call-ins is good. As described for faults at F2, the OMS in conjunction with MAS could determine the extent of the outage and verify power restoration.

Fault at F4:

For a feeder fault at F4 past a recloser, the meters would sense multiple outages due to the voltage fluctuations caused by recloser operations. Note that the time between recloser operations is typically in the milliseconds to seconds range, but some units may be programmed for up to 200 seconds for 4 recloser operations. Thus the recloser cycle may not be complete until 3 recloser trip times and 600 seconds closing delay time. Also, the fault location and resistance will affect the voltage seen by the meters. Using the assumptions of Table 2, more than 1000 electric meters would experience the same event. The probability of the utility becoming quickly aware of the fault due to customer call-ins is very high, and the system can then be used to determine the extent of the outage as well as to monitor the progress in restoring power to affected customers.

Fault at F5:

For a fault at F5, the meters act the same as in the previous Fault at F4 analysis; however, over 3000 electric meters are affected and the utility would probably become aware of the outage very quickly via the OMS.

While systems and methods have been described and illustrated with reference to specific embodiments, those skilled in the art will recognize that modification and variations may be made without departing from the principles described above and set forth in the following claims. Accordingly, reference should be made to the following claims as describing the scope of disclosed embodiments.

What is claimed:

1. A system for assisting a utility in responding to a power outage, comprising:

a plurality of metering points;

a collector that communicates with each of the plurality of metering points to form a fixed wireless metering network, wherein said collector periodically communicates with each of said metering points to establish a communication performance rate for each metering point and wherein the collector sets a potential outage indication after a number of successive communication failures occur with a given metering point; and an outage management system that receives information from the fixed wireless metering network concerning power outage conditions to determine metering points affected by said outage conditions.

2. The system of claim 1, wherein said metering points collect and forward power outage information to said collector.

3. The system of claim 2, wherein said collector and said metering points perform filtering of said power outage information.

4. The system of claim 3, wherein filtering comprises at least one of: configurable delays at said metering points prior to transmitting said power outage information, configurable delays at said metering points prior to transmitting a restoration message, configurable options in said collector that allow data to be aggregated prior to communicating with said outage management system, and configurable options in said collector that allow communications to be suppressed during a large-scale outage.

5. The system of claim 2, wherein said metering points select a random transmit slot within a predetermined transmission period in which to transmit power outage information to the collector.

6. The system of claim 2, wherein said metering points and said collector are adapted to verify a presence of power by measuring a voltage.

7. The system of claim 2, wherein a subset of metering points affected by a power outage are identified, and wherein said subset of affected metering points are assigned to a corresponding subset of collectors for verification of power outage or power restoration.

8. The system of claim 2, wherein said collector is adapted to ping said metering points to determine an extent of a power outage, wherein said ping comprises one of: a ping of each metering point directly, a ping of metering points in a communication path to determine if said communication path is available, and a ping of metering points farthest from said collector along a communication path to validate all metering points in the communication path with one message.

9. The system of claim 2, wherein said collector communicates power restoration information to said outage management system and wherein said collector receives power restoration information from said metering points.

10. The system of claim 1, wherein said fixed wireless metering network comprises a mesh network that enables said metering points to change communication paths.

11. The system of claim 1, wherein the number of successive communication failures required to set the potential outage indication is determined based on the established communication performance rate between the collector and said given metering point.

12. A method for use in a fixed wireless metering network for determining power outage conditions in an electrical distribution network, wherein the fixed wireless metering network comprises at least one collector that communicates wirelessly with a plurality of metering points, the method comprising, at said at least one collector:

periodically communicating with each of the metering points and establishing a communication performance rate for each metering point;

generating an indication of a potential power outage at a given metering point when a rate of success of subsequent communications with the given metering point deviates from the established communication performance rate for that given metering point; and providing the indication to an operator of the electrical distribution network.

13. The method recited in claim 12, wherein said generating step further comprises:

detecting a number of successive communication failures with the given metering point; and generating the indication of a potential power outage if the detected number of successive communication failures exceeds a predetermined number.

14. The method recited in claim 13, wherein the predetermined number is selected based on the established communication performance rate for the given metering point.

15. The method recited in claim 12, further comprising transmitting the indication of a potential power outage to an outage management system that is in communication with the fixed wireless metering network.

16. The method recited in claim 15, further comprising:

delaying the transmission of the indication of a potential power outage for a configurable amount of time; and not transmitting the indication of a potential outage if successful communications with the given metering point resume within the configurable amount of time.

* * * * *